(12) United States Patent
Knollhuber et al.

(10) Patent No.: US 11,084,454 B2
(45) Date of Patent: *Aug. 10, 2021

(54) IGNITER SUPPORT, SUBASSEMBLY, GAS GENERATOR, AND METHOD FOR MANUFACTURING A GAS GENERATOR

(71) Applicant: TRW Airbag Systems GmbH, Aschau a. Inn (DE)

(72) Inventors: Christian Knollhuber, St. Wolfgang (DE); Anja Esau, Mühldorf am Inn (DE); Koller Desiree, Neumarkt St. Veit (DE)

(73) Assignee: TRW AIRBAG SYSTEMS GMBH, Aschau Am Inn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/608,249

(22) PCT Filed: Apr. 4, 2018

(86) PCT No.: PCT/EP2018/058577
§ 371 (c)(1),
(2) Date: Oct. 25, 2019

(87) PCT Pub. No.: WO2018/197167
PCT Pub. Date: Nov. 1, 2018

(65) Prior Publication Data
US 2020/0198571 A1    Jun. 25, 2020

(30) Foreign Application Priority Data

Apr. 28, 2017 (DE) .......................... 102017109208.0

(51) Int. Cl.
*B60R 21/264* (2006.01)
*B29C 45/14* (2006.01)
(Continued)

(52) U.S. Cl.
CPC ...... *B60R 21/264* (2013.01); *B29C 45/14467* (2013.01); *B29C 45/14639* (2013.01);
(Continued)

(58) Field of Classification Search
CPC .............. B60R 21/264; B60R 22/4628; B60R 2021/26029; B60R 2021/26082;
(Continued)

(56) References Cited

U.S. PATENT DOCUMENTS 6,142,515 A * 11/2000 Mika .................... B60R 21/2644
102/531
6,315,322 B1 * 11/2001 Mika .................... B60R 21/2644
280/736

(Continued)

FOREIGN PATENT DOCUMENTS

DE    102009023593    12/2010
JP    2008241186      10/2008

*Primary Examiner* — Samir Abdosh
(74) *Attorney, Agent, or Firm* — Tarolli, Sundheim, Covell & Tummino LLP (57) ABSTRACT

The invention describes an igniter support (22) for an igniter unit (20) of a gas generator (10), comprising a first holder element (30) made from a first material and a second holder element (32) made from a second material different from the first material. Both holder elements (30, 32) can be positively coupled to each other. Further, a subassembly (16), a gas generator (10) and a method for manufacturing a gas generator (10) are described.

17 Claims, 5 Drawing Sheets

(51) Int. Cl.
*B60R 22/46* (2006.01)
*F42B 3/26* (2006.01)
*B29L 22/02* (2006.01)
*B60R 21/26* (2011.01)

(52) U.S. Cl.
CPC ............ *B60R 22/4628* (2013.01); *F42B 3/26* (2013.01); *B29K 2995/0005* (2013.01); *B29K 2995/0007* (2013.01); *B29L 2022/027* (2013.01); *B60R 2021/26029* (2013.01); *B60R 2021/26088* (2013.01)

(58) Field of Classification Search
CPC ......... B29C 45/14467; B29C 45/14639; F42B 3/26; B29K 2995/0005; B29K 2995/0007; B29L 2022/027
USPC ................... 102/530; 280/736, 737, 741
See application file for complete search history.

(56) References Cited

U.S. PATENT DOCUMENTS

| | | | | |
|---|---|---|---|---|
| 6,749,219 B2 * | 6/2004 | Edwards, II | ........ | B60R 21/2644 102/531 |
| 7,052,041 B2 * | 5/2006 | McCormick | ........ | B60R 21/2644 280/741 |
| 7,427,082 B2 * | 9/2008 | Schoenhuber | .......... | B60R 21/26 280/736 |
| 9,879,952 B2 * | 1/2018 | Schwuchow | ............ | B23P 19/00 |
| 2002/0043790 A1 | 4/2002 | Elqadah et al. | | |
| 2002/0144621 A1 * | 10/2002 | McFarland | ......... | B60R 21/2644 102/530 |
| 2003/0047925 A1 * | 3/2003 | Edwards, II | ........ | B60R 21/2644 280/741 |
| 2003/0057686 A1 * | 3/2003 | Goetz | ................. | B60R 21/2644 280/736 |
| 2004/0226472 A1 | 11/2004 | Oda | | |
| 2004/0245753 A1 * | 12/2004 | Kato | .......................... | F42B 3/04 280/736 |
| 2006/0033317 A1 * | 2/2006 | Stevens | .................... | B60R 21/26 280/741 |
| 2007/0193465 A1 * | 8/2007 | Stevens | .................... | F42B 3/107 102/202.1 |
| 2009/0114109 A1 * | 5/2009 | Overton | .................. | F42B 3/103 102/200 |
| 2016/0167618 A1 | 6/2016 | Jordan et al. | | |
| 2016/0169640 A1 * | 6/2016 | Schwuchow | ............. | B23P 19/00 102/530 |
| 2020/0198571 A1 * | 6/2020 | Knollhuber | ....... | B29C 45/14467 |

* cited by examiner

IGNITER SUPPORT, SUBASSEMBLY, GAS GENERATOR, AND METHOD FOR MANUFACTURING A GAS GENERATOR

RELATED APPLICATIONS

This application corresponds to PCT/EP2018/058577, filed Apr. 4, 2018, which claims the benefit of German Application No. 10 2017 109 208.0, filed Apr. 28, 2017, the subject matter of which are incorporated herein by reference in their entirety.

BACKGROUND OF THE INVENTION

The invention relates to an igniter support for an igniter unit of a gas generator as well as to a subassembly comprising an igniter unit and an igniter support. In addition, the invention relates to a gas generator comprising said subassembly as well as to a method for manufacturing a gas generator.

In an automotive vehicle, gas generators are used, for example, to provide the inflation gas required for an airbag of an airbag module within short time, if a control unit outputs a signal for activation or release of the gas generator. For this purpose, gas generators usually include an igniter unit which is connected to the control unit of the automotive vehicle or the airbag module so that an igniter of the igniter unit can be appropriately controlled. As a rule, the connection is made via a cable having a plug that is plugged into a socket of the igniter unit. The socket is also referred to as retainer.

For receiving the igniter unit and, resp., the igniter on the gas generator an igniter support that represents an interface between the gas generator housing of a gas generator and the igniter unit can further be provided. Depending on the design of the igniter support, different types of igniter units can be used in the gas generator. Usually the igniter support is arranged at one end of the gas generator housing so that it seals a combustion chamber formed by the gas generator housing that may comprise a propellant, wherein at least part of the inflation gas for the airbag can be formed by combustion of the propellant.

The plugs used for controlling the igniter unit may have ground contacts which are electrically connected to the gas generator housing to ground the gas generator housing and, resp., to provide electric potential equalization by bringing the gas generator housing for example to the same electric potential as that of a body of the automotive vehicle in which the gas generator is installed.

Typically, the igniter support is made from bars of metal in the form of a one-piece complex turned part, wherein manufacture of such igniter support is very complicated and thus expensive, especially due to turning and milling.

SUMMARY OF THE INVENTION

It is the object of the invention to enable a simple igniter support that can be manufactured at low cost, wherein equally an inexpensive subassembly including such igniter support, a gas generator comprising such subassembly and a manufacturing method including such gas generator is to be stated.

According to the invention, the object is achieved by an igniter support for an igniter unit of a gas generator, comprising a first holder element made from a first material and a second holder element made from a second material different from the first material, both holder elements being adapted to be positively coupled to each other, especially adapted to be at least partially positively nested.

Furthermore, the object of the invention is achieved by a subassembly comprising an igniter support of the afore-mentioned type and an igniter unit.

Moreover, the invention provides a gas generator, comprising a subassembly of the afore-mentioned type, wherein an, especially tubular, gas generator housing is provided in which the subassembly is at least partially accommodated.

It is the fundamental idea of the invention that the igniter support is formed in two parts, the two parts of the igniter support being made from two different materials, for example a metal and a plastic material. In this way, the igniter support is at least partially electrically conducting, thus allowing an electric connection, especially a ground wire, from a plug to the gas generator housing to be designed in a simpler manner. A ground element which is provided in the igniter unit, for example, can be easily coupled to the holder element made from metal which in turn is coupled to the metallic gas generator housing.

The gas generator housing and the holder element made from metal thus may be formed of the same type of material. In this respect, said holder element of metal can be connected to the gas generator housing at low cost via a welded connection. In addition, the entire igniter support can be manufactured at low cost as the holder element made from metal can be subjected to chipless forming, for example by extrusion. Accordingly, said holder element is an out-of-tool part. The holder element made from the plastic material as a plastic part can be manufactured at equally low cost, for example as injection molded part. Thus, complicated finishing of the igniter support is not required. Furthermore, the weight of the igniter support is reduced by reason of the holder element made from plastic material as compared to an igniter support that is completely made from metal.

The positive connection of the two holder elements further ensures that the holder elements can align with each other in the desired way and can be accommodated to be torsion-resistant in a gas generator housing. The two holder elements therefore need not be interconnected before they are introduced to the gas generator housing, as they are simply put on top of each other or assembled. This facilitates mounting of the igniter support on the gas generator housing, as the mounting step in which separate holder elements initially would have to be interconnected, for instance welded together, can be saved. Consequently, the holder elements can be configured so that they align so-to-speak automatically as desired when they are assembled or, resp., nested.

Hence, it is possible that the first holder element is made from an, especially electrically conductive, metal and can be assembled with the igniter unit, especially an igniter thereof, to form a prefabricated assembly group. The second holder element may be made from plastic material. Here, the igniter which itself may be a prefabricated component and represents a constituent of the igniter unit can be inserted into and fastened to or in the first holder element to form the prefabricated assembly group which, in turn, can be inserted into and connected, especially welded, to the generator housing. After that, the second holder element made from plastic may be positively coupled to the first holder element.

One aspect provides that both holder elements are positively coupled in the circumferential direction and/or in the radial direction. Consequently, the two holder elements substantially cannot be rotated relative to each other in the assembled condition, even if the holder elements are not yet fastened in the gas generator housing. In addition, they may be provided to be fixed relative to each other in the radial direction, even if the holder elements are not yet inserted and fastened in the gas generator housing but are merely partially nested.

According to another aspect, the first holder element includes an axial contact surface for the second holder element at an end face associated with the second holder element, and/or the second holder element includes axially protruding projections, especially with the projections having an axial pressure surface via which they interact with the axial contact surface of the first holder element. The axial contact surface of the first holder element thus serves for the form closure in the axial direction. The contact surface of the first holder element interacts appropriately with the pressure surface configured at the second holder element and formed by the projections. The projections extend starting from an end face of the second holder element in the axial direction, the end face in the assembled condition with the first holder element facing the first holder element.

In particular, the first holder element has axially protruding lugs on the or an end face associated with the second holder element, especially wherein the lugs are ramp-shaped so that they are rising from radially outside to radially inside in the direction of the second holder element. Since the first holder element is made from metal, the lugs of the first holder element may serve for electric connection as they are equally made from metal. In addition, the lugs have radially inwardly directed centering surfaces which serve for centering a socket (retainer) of the igniter unit into which the plug is inserted. Each of said centering surfaces may be a subarea of a cylinder surface, especially of a joint cylinder surface. The axially protruding lugs interact with the second holder element by their surfaces facing the second holder element to bring about the form closure in the axial direction.

Preferably, the first holder element has four lugs, three lugs of which are designed equally as to size and shape. Accordingly, one of the four lugs is formed differently, for example larger, thus ensuring orientation of the holder elements relative to each other, especially in the circumferential direction, as the lugs interact with the second holder element. The two holder elements thus adopt a relative position predefined in the circumferential direction due to the differently designed lugs, when the holder elements are assembled.

Another aspect provides that the projections and/or the lugs include contact faces provided in the circumferential direction for the orientation of the holder elements. Via the projections and lugs the two holder elements mesh claw-like so that the positive connection in the circumferential direction is easily resulting. The projections and the lugs abut on each other via the contact faces thereof so that the two holder elements are substantially prevented from rotating relative to each other.

The first holder element may have an edge zone against which the axial contact surface is reset, with the second holder element having an outer edge which is reset against the projections. In the assembled condition, the holder elements abut on each other via the edge zone and the outer edge, the projections being surrounded by the edge zone in the radial direction. Thus, a form closure of the two holder elements is easily resulting in the radial direction.

Furthermore, the second holder element may include at least one radially outwardly arranged, especially hook-shaped, detent element, especially wherein the detent element extends from an end face of the second holder element which is remote from the first holder element. Via the detent element the igniter support, especially the second holder element, can be (pre)fixed true to position to the gas generator housing, as the detent element locks in an opening provided in the gas generator housing, for example, if the second holder element is in the intended position relative to the gas generator housing. Since the second holder element is made from plastic material, the detent element is formed integrally with the base body of the second holder element, with the required elasticity of the detent element being provided due to the shape thereof and/or the material used.

According to another aspect, the second holder element includes, at the inner face thereof, an undercut for the igniter unit, especially for the socket. The undercut may serve for receiving the socket of the igniter unit, thus allowing the same to be equally fixed in the desired position with respect to the igniter support.

One aspect provides that the first holder element is formed at least in areas so that the igniter unit and, resp., the igniter is at least partially received by the first holder element. For example, the igniter of the igniter unit is crimped or beaded partially into the metallic first holder element, thus causing the igniter to be fixed in position with respect to the igniter support.

According to another aspect, the igniter unit includes a socket inserted in the second holder element. The socket represents the common plug interface in which a corresponding plug coding is provided. Usually the socket is made from plastic material, wherein a metal insert is provided through which at least one short circuit spring as well as at least one ground element may be configured in the form of a ground claw. The socket made from plastic material may be inserted in the second holder element made from plastic material as a separate component. Preferably, the second holder element includes a universally formed socket seat so that different sockets can be inserted.

Further the socket may be provided to be injected into the second holder element or to be attached directly thereto by injection molding. The socket is thus integrated in the second holder element in one piece and, resp., by material bond by means of injection molding. Consequently, merely one single plastic component is given which at the same time is the socket of the igniter unit and the second holder element of the igniter support.

According to one aspect, the gas generator housing has at least one stop face for the subassembly comprising the igniter support with the igniter unit accommodated therein. The stop face ensures the two holder elements to adopt the intended position with respect to the gas generator housing when the subassembly is inserted, especially press-fitted. There may be two stop faces which are formed at different locations on the gas generator housing, thus ensuring the subassembly to be inserted in the gas generator housing in the desired orientation. The igniter support, especially the second holder element, accordingly includes correspondingly formed steps that are radially protruding and interact with the corresponding stop faces.

Furthermore, the gas generator housing may include, in an end section, at least one opening through which the subassembly is fixed in position on the gas generator housing, especially wherein the detent element of the second holder element extends through the opening. The opening in the gas generator housing ensures the igniter support, especially the second holder element including the detent element, to be (pre)fixed on the gas generator housing in a simple manner so that it adopts a desired position in the gas generator housing. The opening may be provided at a location of the gas generator housing which is easily visible in the installed condition of the gas generator. In this way, it can easily be checked whether the gas generator has been correctly assembled, especially whether the igniter support is at the correct position inside the gas generator housing, as the detent element then extends through the corresponding opening. Thus, the check may be visual, for example by means of a camera in an automated manner.

It may be provided that at least the detent element has a color that is different from the color of the gas generator housing, for example a signal color, so that the correct installation of the igniter support and thus of the entire subassembly can be easily checked.

The gas generator may be a pyrotechnical gas generator, a hybrid gas generator, a belt tensioner or an actuator, especially for a hood prop or a roll-over bar of a vehicle, the gas generator housing being tube-shaped or toroid-shaped. In so far, the gas generator may be used for various purposes, for instance as part of a vehicle occupant protection device comprising an airbag module, or as a general actuator, especially for pedestrian protection.

Consequently, the invention also provides a subassembly comprising an igniter support according to the invention and an igniter unit.

In the subassembly the first holder element may be formed at least in some areas such that the igniter unit is at least partially received by the first holder element. In addition, or as an alternative, it is possible for the igniter unit, especially an igniter thereof, to be glued at least in some areas to the first holder element.

Moreover, in the subassembly the igniter unit may comprise a socket that is inserted in the second holder element or is attached by injection molding to the second holder element to form an integral component with the latter. Preferably, the socket includes a ground element which contacts the first holder element in an electrically conducting manner.

In addition, the invention provides a method for manufacturing a gas generator, especially a gas generator of the afore-mentioned type, comprising the following steps of:
providing a gas generator housing,
providing a subassembly of the afore-mentioned type,
inserting the subassembly into the gas generator housing.

As already explained, the subassembly can initially be assembled by putting the two holder elements on top of each other and inserting them into the gas generator housing. Alternatively, the two holder elements may also be inserted successively and each individually into the gas generator housing, i.e. initially the first holder element and subsequently the second holder element. Due to the shape of the holder elements, they are ensured to align with each other in a desired way, especially also with components coupled to the holder elements, for example components of the igniter unit. The subassembly can be press-fitted into the gas generator housing until the second holder element abuts on a stop face of the gas generator housing via an appropriately configured step. The first holder element then can be welded to the gas generator housing.

In addition, the first holder element of the igniter support made from metal can be used to contact ground and, resp., short circuit elements. Thus, implementation of the ground and, resp., short circuit connection is facilitated as via the first holder element already a conducting connection to the gas generator housing is formed. Hence there may be provided a ground element bridging the second holder element of the igniter support that is made from plastic material.

Alternatively, the second holder element may be made from electrically conductive plastic material so that no separate ground element has to be utilized. Nevertheless, the igniter support is of multi-part design, wherein the first holder element made from metal is an out-of-tool part so that it need not be reworked. Due to the positive coupling of the two holder elements, the latter need not be initially interconnected.

Another aspect provides the igniter to be fastened to the first holder element by partially forming the first holder element, of preference before the second holder element is coupled to the first holder element, which offers the advantage that compact simple mounting of only two components is required. In addition, or as an alternative thereto, a socket may be inserted into the second holder element, either as an independent separate component or in the form of a socket attached directly to the second holder element by injection molding so that said two units are interconnected in one piece. Accordingly, the igniter can be easily attached true to position to the igniter support. The igniter can be at least partially beaded into the first holder element. The socket can be inserted into the second holder element before the latter is introduced to the gas generator housing.

The socket and the second holder element thus can also be interconnected alternatively by material bond by injecting the socket into the second holder element so that one single component is resulting which at the same time is part of the igniter support and part of the igniter unit. The socket made from plastic material and the second holder element made from plastic material are appropriately interconnected by injection molding. For example, both elements are simultaneously produced by two-component injection molding, or the socket is attached to the already produced holder element by injection molding, wherefrom equally a one-piece component is resulting.

As an alternative to the afore-described method, the invention provides another method for manufacturing a gas generator, especially a gas generator of the afore-mentioned type, comprising the following steps of:
providing a gas generator housing, a first holder element, a second holder element, an igniter, a sealing element and a socket,
inserting the igniter into the first holder element, optionally previously inserting a sealing element into the same, and fastening the igniter to the first holder element, preferably by crimping and/or gluing, for forming a prefabricated assembly group,
inserting the prefabricated assembly group into the gas generator housing, of preference at an axial end section of the gas generator, and fastening, preferably by means of welding, the prefabricated assembly group at an area of the first holder element to the gas generator housing,
inserting the second holder element into the generator housing in the direction of the prefabricated assembly, preferably aligning the second holder element with the first holder element in the radial direction, and fastening the second holder element to the gas generator housing and/or the first holder element,
inserting the socket which optionally includes an integrated ground element into the second holder element, or injecting or attaching by injection molding the socket to the second holder element comprising optional injection of a ground element into the socket in the same injecting operation, and in case of the presence of the ground element, establishing a contact between the ground element and the first holder element.

It is of particular advantage in this method that first a compact prefabricated assembly group comprising only two components is produced. As first only the igniter is inserted into and fastened to the first holder element, merely an extremely small space is required for this mounting. Here, it is provided that the igniter is inserted in the axial direction into a receiving opening of the first holder element and a retaining portion in the form of an axially protruding, radially circumferential edge zone of the first holder element is folded radially inwardly onto a respective circumferential area of the igniter or, resp., is crimped to the same. Optionally, before inserting the igniter a sealing element, preferably an O-ring, can be inserted into the receiving opening of the first holder element so as to subsequently insert the igniter onto said sealing element in order to increase the tightness of the connection between the igniter and the first holder element. In order to additionally increase said tightness, the igniter could additionally be fastened to the first holder element by bonding, the bonding being carried out by an appropriate adhesive which covers the sealing element and corresponding contact areas of the igniter and of the first holder element. Such bonding can be carried out even without the sealing element and, as an alternative to that, even without crimping the circumferential edge zone of the first holder element, wherein the igniter is thus retained in and fastened to the first holder element merely by the bonding.

After insertion of the second holder element into the generator housing, the second holder element can be fastened to the gas generator housing by form and/or force closure, for example by the locking of one or more detent elements of the second holder element in one or more corresponding openings in the gas generator housing. In addition, or alternatively, the second holder element may be fastened also to the first holder element, equally by form and/or force closure. Finally, the socket that may optionally include a ground element has to be mounted, which can be performed in the following two alternative ways. The socket that includes an optional integrated ground element can be inserted into the second holder element. Accordingly, the socket is a prefabricated plastic part which optionally may already comprise an inserted, preferably injected ground element. As an alternative to this, the socket may only be manufactured by injecting or attaching the socket by injection molding to the second holder element. In the last-mentioned injecting or attaching operation it may be advantageous to directly integrate and thus to inject an optional ground element in the socket. In case that the ground element is present, the ground element is made to contact the first holder element, especially in an electrically conducting manner, so that "ground connection" is possible. "Ground connection" means that a plug adapted to be plugged into the socket has a metallic ground contact terminal which can be connected in an electrically conducting manner via the ground element, further via the first holder element to the gas generator housing so as to represent a desired electric potential equalization between the electric potential of the vehicle, especially a vehicle body in which the gas generator is accommodated, and the electric potential of the gas generator housing.

BRIEF DESCRIPTION OF THE DRAWINGS

Further advantages and characteristics of the invention will be evident from the following description and the drawings that will be referred to, wherein.

DESCRIPTION

Figure 1:
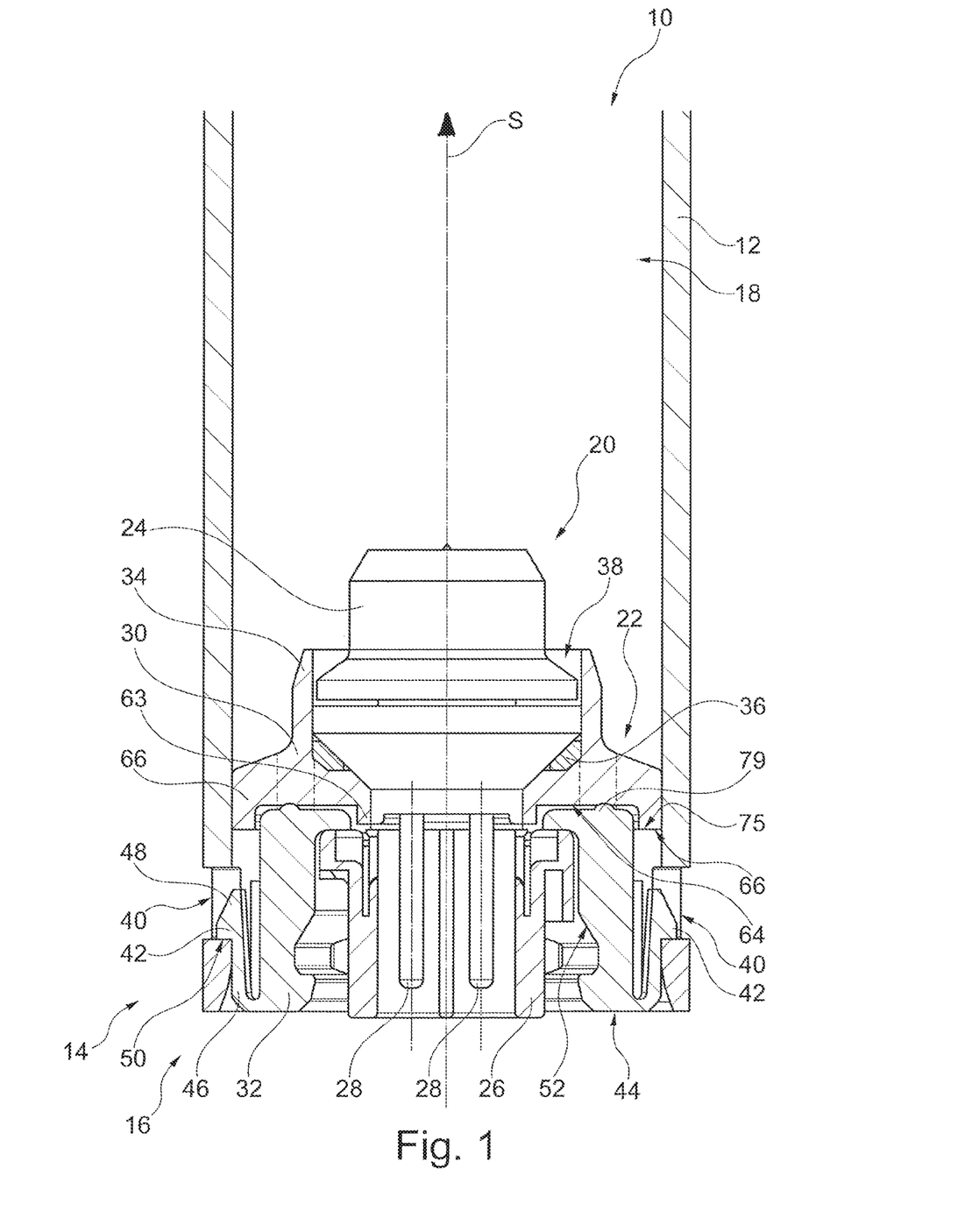
FIG. 1 shows a sectional view of a gas generator according to the invention in the area of a subassembly according to the invention.
Figure 2:
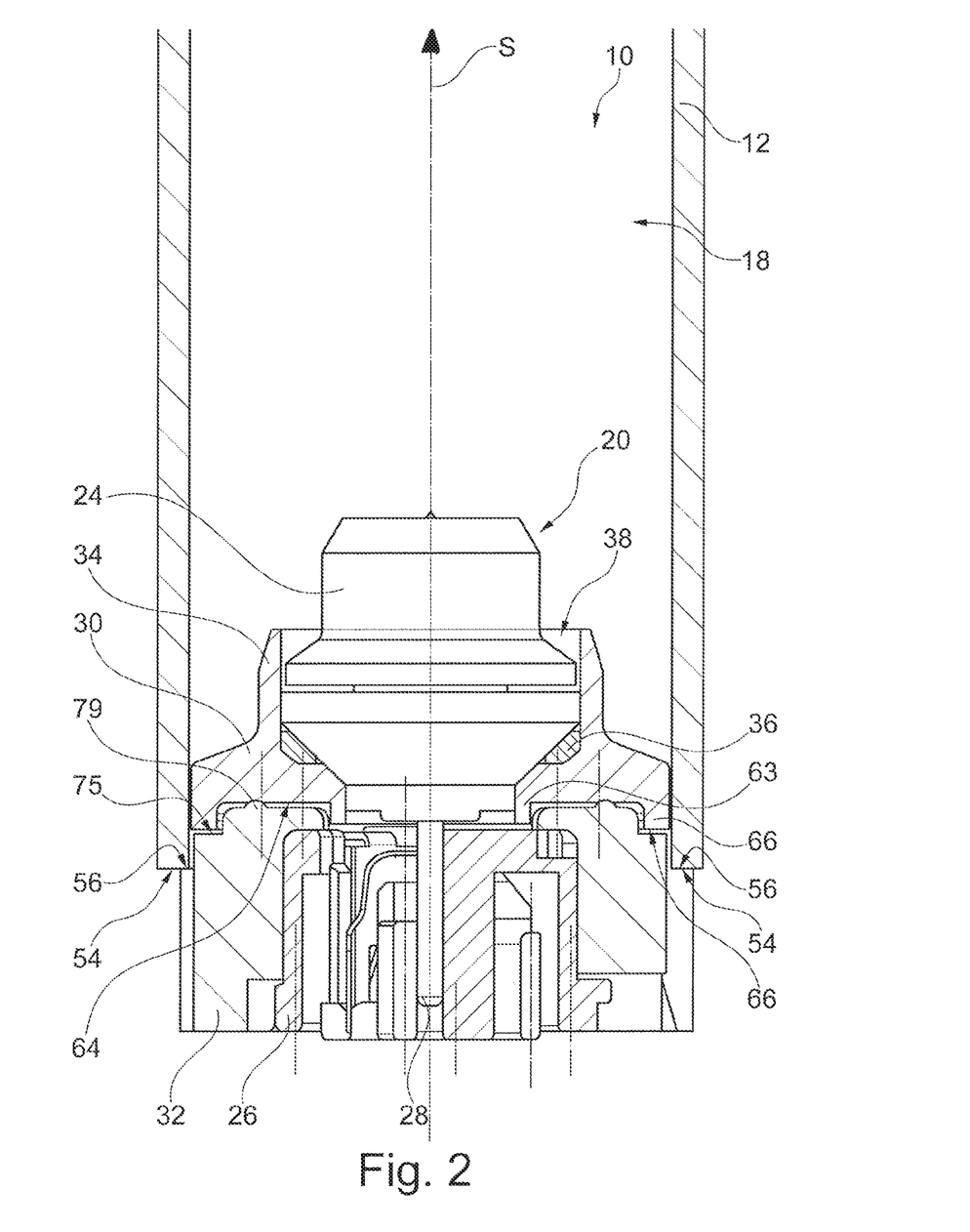
FIG. 2 shows a sectional view of the gas generator according to the invention of FIG. 1 rotated about 90° vis-à-vis FIG. 1.
Figure 3:
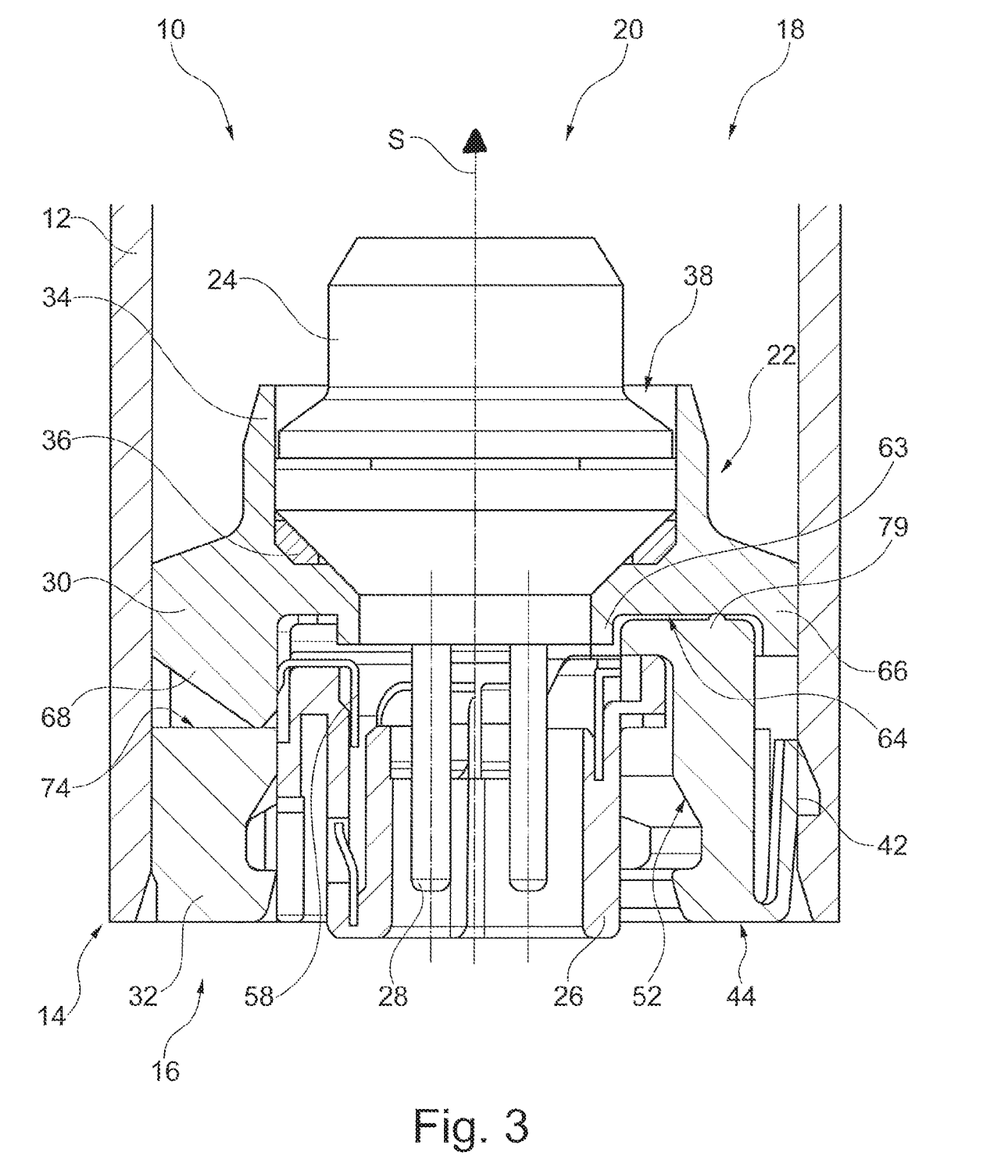
FIG. 3 shows another sectional view of the gas generator according to the invention of FIGS. 1 and 2 in a sectional plane different from FIG. 1.

In FIGS. 1 to 3, a gas generator 10 adapted to generate inflation gas for an airbag that helps protect a vehicle occupant of an automotive vehicle in the case of crash is illustrated partially in different sectional views.

The gas generator 10 comprises a gas generator housing 12 that is shown merely partially in the Figures. In the shown embodiment, it is a tube-shaped gas generator housing 12 so that the entire gas generator 10 is substantially tube-shaped.

The gas generator 10 has a longitudinal axis S which also defines an axial direction of the gas generator 10, i.e. starting from an axial end portion 14 in the direction of a first holder element 30, as illustrated by the arrow symbols in FIGS. 1-3, so that the gas generator 10 shows a substantially cylindrical design. The gas generator 10 moreover may be substantially symmetric with respect to the longitudinal axis S.

There is represented merely the axial end section 14 of the gas generator 10 in which a subassembly 16 which seals the gas generator housing 12 is arranged on a gas generator housing 12 so that a gas-tight combustion chamber 18 to which the subassembly 16 is adjacent is formed in the gas generator housing 12. The combustion chamber may hold a propellant (not shown) which is ignited and burnt upon activation of the gas generator 10 to produce gas, for example for inflating an airbag. The propellant may consist of a filling of individual propellant bodies such as e.g. compressed propellant pellets or extruded bodies, but may also be in the form of a monolithic molded body or in the form of lined up disks or rings.

The subassembly 16 includes an igniter unit 20 as well as an igniter support 22 which supports or holds the igniter unit 20 at least partially within the gas generator housing 12. The igniter support 22 forms the interface between the gas generator housing 12 and the igniter unit 20. In general, the igniter support 22 helps to safeguard that the igniter unit 20 takes a desired position with respect to the gas generator housing 12.

The igniter unit 20 comprises an igniter 24 that protrudes partially into the combustion chamber 18 as well as a socket 26 that may also be referred to as retainer into which a plug (not shown) can be plugged to electrically contact the igniter 24 and, resp., couple the latter to a controller adapted to control and, resp., activate the igniter unit 20. For this purpose, the igniter 24 includes contact pins 28 which are received within or surrounded by the socket 26. For example, the socket 26 is a plastic part.

Each of the igniter 24 and the socket 26 is held by the igniter support 22, as is evident from FIGS. 1 to 3.

To this end, the igniter support 22 includes the first holder element 30 and a second holder element 32 which are formed separately from each other and are positively coupled to each other, especially in the circumferential direction and in the radial direction. The two holder elements 30, 32 are moreover made from different materials.

In the shown embodiment, the first holder element 30 is made from metal so that it is electrically conductive, whereas the second holder element 32 is made from plastic material which is not electrically conductive. The two holder elements 30, 32 are illustrated in detail in each of the FIGS. 4 to 7.

The first holder element 30 serves for fixing the igniter 24 within the gas generator housing 12. For this purpose, the first holder element 30 has an axially protruding annular retaining portion 34 which is collar-shaped. The retaining portion 34 may be (plastically) formed at its free end so as to receive the igniter 24 in a safe position, especially the retaining portion 34 is beaded or crimped, particularly radially inwardly onto a corresponding circumferential area of the igniter. Preferably, merely a lower area, viz. an area facing the contact pins 28, of the igniter 24 is held by the retaining portion 34 so that an upper area, viz. an area remote from the contact pins 28, of the igniter 24 extends into the combustion chamber 18, wherein the upper area can be opened upon activation of the igniter 24 and can release hot gases and, resp., particles that are adapted to ignite the propellant (not shown) in the combustion chamber.

Alternatively, or additionally to the described (plastic) forming of the retaining portion 34, it is also possible that the igniter 24 is fixed or fastened in the first holder element 30 by means of bonding. Between the igniter 24 and the first holder element 30 a sealing element 36 may be inserted to increase tightness in the joining area. The sealing element 36 in the illustrated embodiment is an O-ring pinched between the igniter 24 and the first holder element 30.

The first holder element 30 thus forms a seat 38 for the igniter 24 and the sealing element 36 via the retaining portion 34.

It is further evident from FIG. 1 that the gas generator housing 12 in the end section 14 has two openings 40 through each of which a detent element 42 of the igniter support 22, especially of the second holder element 32, extends. In the shown embodiment, the detent elements 42 are hook-shaped, which is why they can also be referred to as detent hooks. There may be introduced even more than two openings 40, in particular three or four openings, to a sidewall of the gas generator housing 12, preferably being radially circumferential. The shape of the openings 40 may be designed to be round, especially circular, or circumferentially slit-shaped or rectangular, wherein here also the shapes of the openings 40 may be different from each other, wherein e.g. a shape of one opening 40 may be different from that of all further openings 40 in order to obtain sort of a positioning or marking option of the gas generator housing 12.

Each of the detent elements 42 extends from an end face 44 of the second holder element 32, which is remote from the first holder element 30, in the direction of the first holder element 30, each of the detent elements 42 comprising a spring portion 46 which provides, inter alia, a desired elasticity of the detent elements 42. Adjacent to the spring portion 46, there is provided a respective detent portion 48 forming a corresponding detent surface 50 which, in the locked condition of the detent element 42 in the opening 40, rests against the edge of the corresponding opening 40.

Furthermore, it is evident from FIG. 1 that the second holder element 32 has an undercut 52 in which the igniter unit 20, especially the socket 26, is partially received. The undercut 52 ensures the socket 26 and thus the igniter unit 20 to be arranged true to position in the igniter support 22. The second holder element 32 consequently serves for positioning the socket 26.

As a consequence, the igniter 24 of the igniter unit 20 is positioned via the first holder element 30 and the socket 26 of the igniter unit 20 is positioned via the second holder element 32 in a desired way inside the gas generator housing 12. Accordingly, the igniter support 22 serves for positioning and connecting the igniter unit 20 within the gas generator housing 12.

FIG. 2 illustrates that the gas generator housing 12 has two stop faces 54 for the subassembly 16, especially for the second holder element 32, so that the subassembly adopts a predefined position with respect to the gas generator housing 12 when the subassembly 16 is inserted into the gas generator housing 12, especially press-fitted in the axial end section 14. The second holder element 32 may include a radially protruding step 56 via which the subassembly 16 then abuts on corresponding stop faces 54. The step 56 may be a radially protruding pressing lug configured to be resilient and, resp. plastically deformable in the radial direction.

The two stop faces 54 may be designed differently as regards their axial position, thus allowing a defined orientation in the circumferential direction of the subassembly 16, especially of the second holder element 32, to be fixed in the gas generator housing 12. Also, the stop faces 54 can have different widths. The step 56 and, resp., corresponding steps 56 are designed differently in an analogous manner.

FIG. 3 demonstrates how a ground contact of the igniter unit 20, especially of the socket 26, is produced via a separately formed ground element 58 with the gas generator housing 12. The first holder element 30 made from metal to which the ground element 58 is connected is utilized for the electric connection. The ground element 58 can be designed in the form of a ground claw which appropriately claws into the first holder element 30 to contact a circumferential inner area of the first holder element 30 in an electrically conducting manner.

In general, the ground element 58 may be part of a metal insert being surrounded by the socket 26 made from plastic material. The metal insert may serve, in addition to establishing a ground contact, also for forming a short circuit element which short-circuits the contact pins 28 of the igniter 24 in an electrically conducting manner, unless a plug is plugged in the socket 26. As soon as a plug is plugged into the socket 26, the short circuit element is pressed away by the contact pins 28 in such a way that the previously electrically conducting short circuit between the two contact pins 28 is neutralized.

Figure 4:
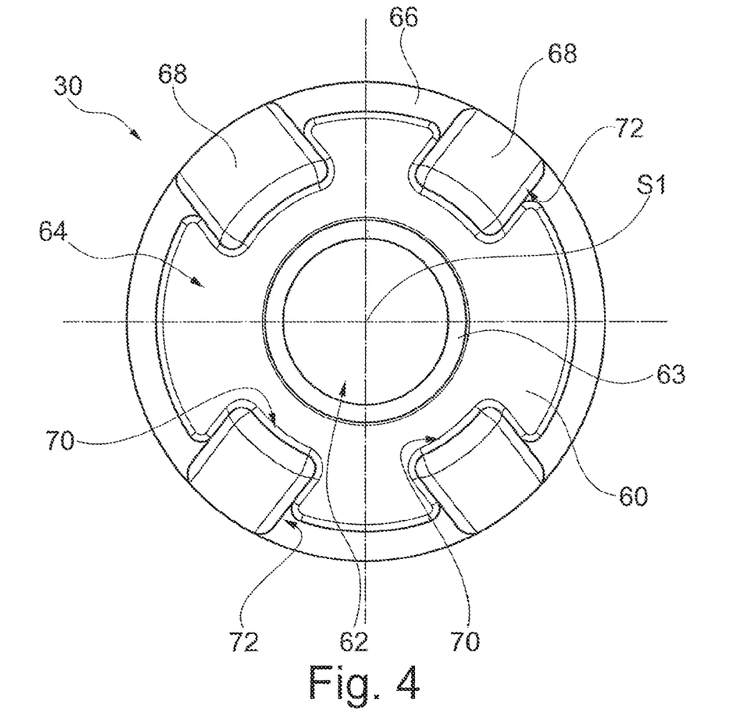
FIG. 4 shows a top view onto a first holder element of an igniter support according to the invention.
Figure 5:
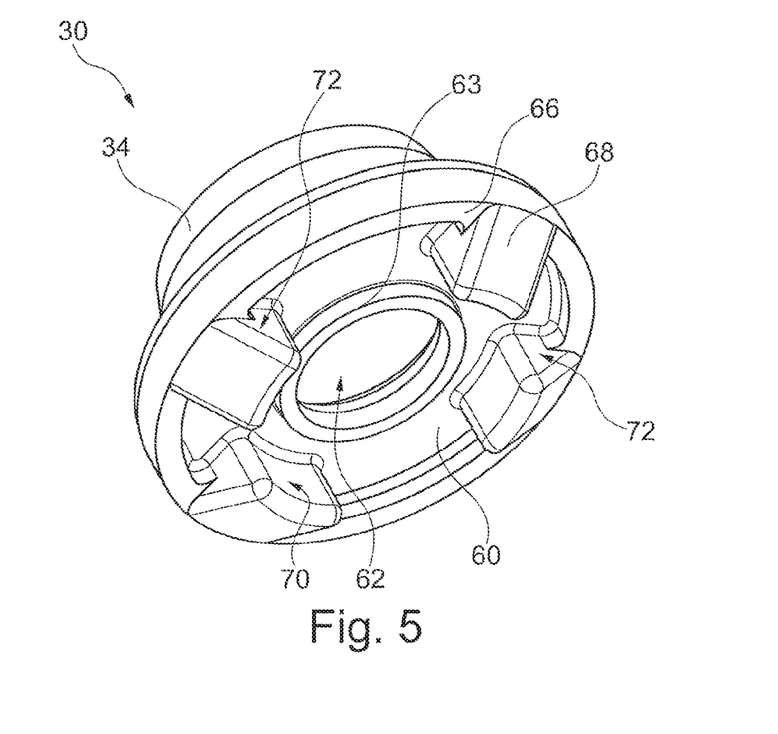
FIG. 5 shows a perspective view of the first holder element of FIG. 4.

In FIGS. 4 and 5, the first holder element 30 is illustrated in detail. It is evident from the Figures that the first holder element 30 has a substantially annular base 60 having a longitudinal axis S1 that extends centrally through a recess 62 in the base 60 in the axial direction.

The recess 62 is moreover surrounded by a collar edge 63 designed in ring shape.

The first holder element 30 furthermore has an axial contact surface 64 which is reset against a radially outer edge zone 66. The axial contact surface 64 is moreover reset even against the collar edge 63 extending, just as the edge zone 66, in the axial direction over the contact surface 64. Each of the collar edge 63, the axial contact surface 64 and the edge zone 66 faces the second holder element 32 in the assembled condition of the igniter support 22, viz. when the first holder element 30 is coupled to the second holder element 32 (cf. FIGS. 1 to 3).

The collar edge 63 as well as the edge zone 66 are arranged substantially concentrically around the longitudinal axis S1 so that therebetween a recessed free space is formed which is axially delimited by the contact surface 64.

From the axial contact surface 64 four lugs 68 project in the axial direction, i.e. in the direction of the second holder element 32, when the igniter support 22 is in the assembled condition. The lugs 68 are ramp-shaped, wherein they are rising in the axial direction from radially outside to radially inside, in the direction of the second holder element. In addition, the lugs 68 start from the edge zone 66 from radially outside to radially inside, and thus from a position raised vis-à-vis the axial contact surface 64. The lugs may enclose also other geometric three-dimensional shapes, however, and may be rectangular or cube-shaped, for example.

The lugs 68 have centering surfaces 70 that are bent radially inwardly. Each of the centering surfaces 70 of the lugs 68 constitutes a segment of a surface area of a cylinder, with the socket 26 of the igniter unit 20 being centered via the centering surfaces 70. The centering surfaces 70 form especially segments of a joint surface area of one single cylinder, thereby accordingly facilitating centering of the socket 26.

From FIG. 3, it is moreover resulting that the lugs 68, preferably the centering surfaces 70 thereof, serve for contacting the ground element 58. Hence, the ground element 58 abuts on at least one of the centering surfaces 70 to establish the electric connection.

Further, the lugs 68 have respective contact surfaces 72 in the circumferential direction via which the lugs 68 interact with the second holder element 32 to configure a form closure in the circumferential direction, as will be explained hereinafter.

In the shown embodiment, one of the lugs 68 (at the top left in FIG. 4) has a width unlike that of the other lugs 68, thereby ensuring orientation of the two holder elements 30, 32 relative to each other when the latter are assembled.

Figure 6:
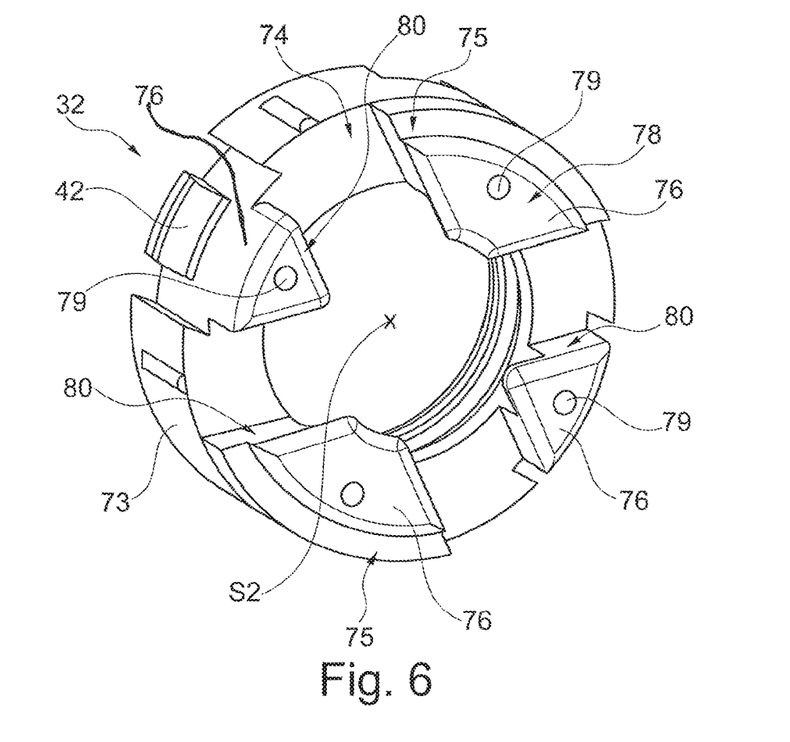
FIG. 6 shows a perspective view of a second holder element of an igniter support according to the invention.
Figure 7:
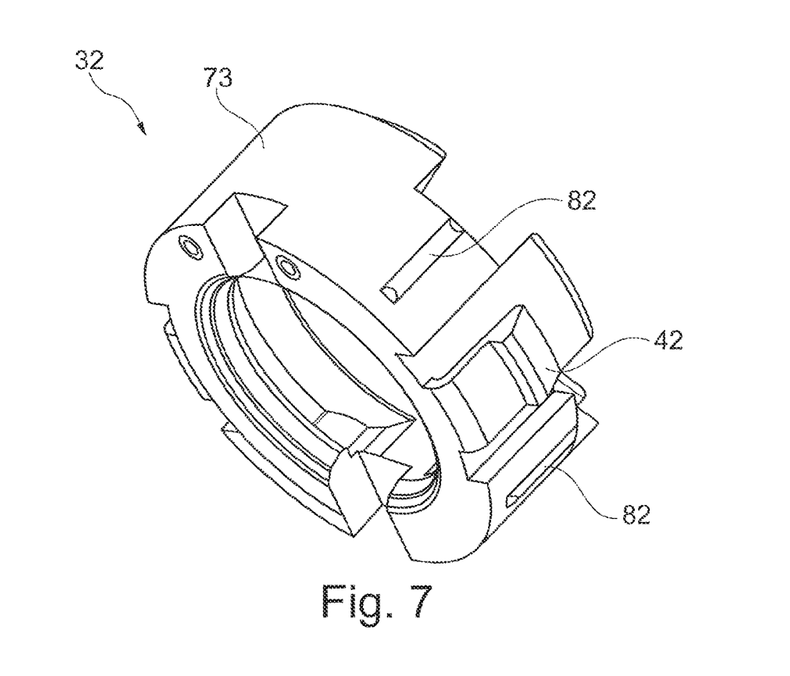
FIG. 7 shows another perspective view of the second holder element of FIG. 6.

The second holder element 32 shown in detail in FIGS. 6 and 7 equally has a substantially annular base body 73 including a central recess so that also the second holder element 32 has a longitudinal axis S2 which extends along the axial direction.

The base body 73 has an axial end face 74 facing, in the assembled condition, the first holder element 30 (see FIG. 3), with the lug 68 and the end face 74 respectively contacting each other. The axial end face 74 is reset in the axial direction vis-à-vis an outer edge 75 which is configured two times partly circular.

Moreover, in the shown embodiment, four projections 76 which together form an axial pressure surface 78 that is accordingly parallel to the axial end face 74 protrude in the axial direction from the axial end face 74. Respective opposing projections 76 are designed to be identical.

On the axial pressure surface 78, especially on the respective projections 76, there are moreover formed pressing lugs 79 which protrude in the axial direction vis-à-vis the pressure surface 78.

The second holder element 32 is pressed, in the assembled condition of the first and second holder elements 30, 32, against the first holder element 30 in such a way that the pressing lugs 79 which are axially protruding are pressed onto the axial contact surface 64 of the first holder element 30, thereby bringing about the form closure in the axial direction (see FIGS. 1 to 3).

In addition, the lugs 68 of the first holder element 30 may be pressed onto the axial end face 74 of the second holder element 32. Therefore, the lugs 68 of the first holder element 30 may equally be perceived as pressing lugs.

The lugs 68 of the first holder element 30 and the projections 76 of the second holder element 32 are dimensioned so that therebetween free spaces are formed in which the projections 76 and, resp., the lugs 68 may appropriately engage. Accordingly, the two holder elements 30, 32 at least partly engage in their assembled condition, viz. via their lugs 68 and projections 76.

The axially protruding projections 76 equally include, when viewed in the circumferential direction, bearing surfaces 80 via which the second holder element 32 makes a form closure in the circumferential direction with the bearing surfaces 72 of the first holder element 30 so that the two holder elements 30, 32 substantially cannot be rotated relative to each other.

Both the lugs 68 and the projections 76 have at their respective ends opposed in the circumferential direction two bearing surfaces 72 (relating to the lugs 68) and 80 (relating to the projections 76).

The projections 76 of the second holder element 32 are moreover received by form closure between the outer edge 66 and the collar edge 63 of the first holder element 30 in the radial direction so that the two holder elements 30, 32 in the assembled condition are substantially fixed relative to each other in the radial direction.

It is further evident from FIG. 7 that the second holder element 32 has radially protruding spring lugs 82 via which the second holder element 32 is supported and centered in the radial direction in the condition installed in the gas generator housing 12. The radially protruding spring lugs 82 also serve for compensating manufacturing tolerances which cannot be avoided during manufacture.

Moreover, the radially protruding spring lugs 82 may interact with the stop faces 54 of the gas generator housing 12 in the axial direction. The spring lugs 82 are configured such that at an axial pressure they do not compress in the radial direction, that is why the subassembly 16 can abut on the stop faces 54 in the axial direction so that the subassembly 16 is at the intended location as regards its axial position.

Generally, the two holder elements 30, 32 are substantially symmetric, with the longitudinal axes S1, S2 thereof in the mounted condition coinciding with the longitudinal axis S of the gas generator 10.

Thus, there are provided a gas generator 10, a subassembly 16 comprising the igniter unit 20 as well as the igniter support 22 by which an electric contact and, resp., a ground contact can be easily established, wherein the igniter support 22 in addition can be produced in a cost-efficient and simple manner.

For manufacturing the gas generator 10 at first the single parts can be provided, i.e. the gas generator housing 12 as well as the subassembly 16, wherein the latter may equally be provided in the dismounted condition, i.e. the igniter unit 20 comprising the igniter 24 and the socket 26, as well as the igniter support 22 comprising the first and second holder elements 30 and 32.

When manufacturing the gas generator housing 12, preferably in one production step the openings 40 and the stop faces 54 are formed in the gas generator housing 12 to minimize possible manufacturing tolerances. Further, the gas generator housing 12 has an inner diameter that constitutes a press-fit for the first holder element 30 when the latter is inserted or press-fitted into the gas generator housing 12.

Before this, however, the igniter 24 is coupled to the first holder element 30 by inserting the igniter 24 and the sealing element 36 into the seat 38 and subsequently forming, especially beading, the retaining portion 34 of the first holder element 30. Alternatively, or additionally, the igniter 24 may also be glued and, resp., inserted into the first holder element 30 and may be bonded with the same.

Subsequently, the socket 26 is inserted into the second holder element 32 which is then assembled with the first holder element 30. Here, the holder elements 30, 32 align with each other in the circumferential direction so that they engage at least partially via their lugs 68 and, resp., projections 76. At the same time, the socket 26 is centered via the centering surfaces 70. It is also imaginable that initially the second holder element 32 is coupled to or nested with the first holder element 30 and after that the socket 26 is inserted into the second holder element 32.

In addition, the at least one ground element 58 can be coupled or brought into contact with the first holder element 30, especially with one of the centering surfaces 70. Accordingly, the ground element 58 may already be an integral part of the socket 26.

Then the subassembly 16 manufactured before and comprising the igniter unit 20 as well as the igniter support 22 is inserted through the open end of the gas generator housing 12 into the latter until the subassembly 16 axially abuts on the stop faces 54 of the gas generator housing 12 via the second holder element 32, especially via a respective step.

The detent elements 42 of the second holder element 32 then snap substantially simultaneously into the corresponding openings 40 in the gas generator housing 12 so that the subassembly 16 is (pre)fixed.

Subsequently, a welded connection can further be formed between the gas generator housing 12 and the first holder element 30 so that the subassembly 16 is fixed in its final position.

By the welded connection at the latest, an electric connection is established between the first holder element 30 and the gas generator housing 12, wherein typically said electric connection was given already before due to the press-fit.

Alternatively, the socket 26 may be integrated, i.e. injected or attached by injection molding, already in one piece in the second holder element 32 so that merely one single plastic component is present which at the same time is part of the igniter support 22 and of the igniter unit 20.

Furthermore, the two holder elements 30, 32 may also be inserted successively and each individually into the gas generator housing 12, viz. initially the first holder element 30 and subsequently the second holder element 32. The ground contact can be established by ground elements 58 in the form of ground claws which claw into the already inserted first holder element 30.

When press-fitting the second holder element 32, the latter presses the first holder element 30 along the press-fit formed in the gas generator housing 12 until the second holder element 32 abuts on the stop face(s). In so doing, also the corresponding detent elements 42 lock in the openings 40 in a way analogous to the afore-described embodiment. As an alternative to that, mounting can be carried out as follows. The sealing element 36 is inserted into the first holder element 30, then the igniter 24 is equally inserted into the first holder element 30, axially onto the sealing element 36. Now the igniter 24 is fastened to the first holder element 30 by crimping the retaining portion 34 of the first holder element 30 for forming a prefabricated assembly group.

The assembly group prefabricated in this way is now inserted into the gas generator housing 12 at the axial end section 14 thereof and is fastened by welding the first holder element 30 to the gas generator housing 12.

After that, the second holder element 32 is inserted into the generator housing 12 in the direction of the prefabricated assembly group and is aligned with the first holder element 30 in the radial direction, the second holder element 32 being fixed to the gas generator housing 12 by locking the detent elements 42 of the second holder element 32 in the corresponding openings 40 within the gas generator housing 12.

Finally, the socket 26 having an integrated ground element 58 is inserted into the second holder element 32. As an alternative to that, the socket 26 may be manufactured just by injecting or attaching by injection-molding the socket 26 to the second holder element 32, with a ground element 58 being also injected into the socket 26.

The invention claimed is:

1. An igniter support (22) for an igniter unit (20) of a gas generator (10), comprising a first holder element (30) made from a first material and a second holder element (32) made from a second material different from the first material, wherein both holder elements (30, 32) are adapted to be positively coupled to each other, especially to be at least partially positively nested, wherein the first holder element (30) has an axial contact surface (64) for the second holder element (32) on an end face associated with the second holder element (32), and/or the second holder element (32) has axially protruding projections (76), especially wherein the projections (76) have an axial pressure surface (78) via which they interact with an axial contact surface (64) of the first holder element (30).

2. The igniter support (22) according to claim 1, wherein the first holder element (30) is made from metal and can be assembled with the igniter unit (20) to form a prefabricated assembly group, and wherein the second holder element (32) is made from plastic material.

3. The igniter support (22) according to claim 1, wherein both holder elements (30, 32) are positively coupled in the circumferential direction and/or in the radial direction.

4. The igniter support (22) according to claim 1, wherein the first holder element (30) includes axially protruding lugs (68) at the end face associated with the second holder element (32).

5. The igniter support (22) according to claim 4, wherein the projections (76) and/or the lugs (68) include bearing surfaces (80, 72) provided in the circumferential direction for orientating the holder elements (32, 30).

6. An igniter support (22) for an igniter unit (20) of a gas generator (10), comprising:
a first holder element (30) made from a first material and a second holder element (32) made from a second material different from the first material, wherein both holder elements (30, 32) are adapted to be positively coupled to each other, wherein the second holder element (32) has at least one detent element (42) arranged radially outside and being especially hook-shaped, and wherein the detent element (42) extends from an end face of the second holder element (32) which is remote from the first holder element (30).

7. The igniter support (22) according to claim 1, wherein the second holder element (32) includes, on the inner face thereof, an undercut (52) for the igniter unit (20).

8. A subassembly (16) comprising an igniter support (22) according to claim 1 and an igniter unit (20).

9. The subassembly (16) according to claim 8, wherein the first holder element (30) is formed at least in some areas so that the igniter unit (20) is received at least partly by the first holder element (30), and/or in that the igniter unit (20) is bonded at least in some areas with the first holder element (30).

10. The subassembly (16) according to claim 8, wherein the igniter unit (20) comprises a socket (26) which is inserted in the second holder element (32) or which is attached to the second holder element (32) by injection molding to form an integral component with the latter.

11. A gas generator (10) comprising a subassembly (16) according to claim 8, including a gas generator housing (12) in which the subassembly (16) is at least partially received, the gas generator housing (12) including at least one stop face (54) for the subassembly (16).

12. The gas generator (10) according to claim 11, wherein the gas generator housing (12) in an end section (14) includes at least one opening (40) via which the subassembly (16) is fixed in position on the gas generator housing (12).

13. The gas generator (10) according to claim 11, wherein the gas generator (10) is a pyrotechnical gas generator, a hybrid gas generator, a belt tensioner or an actuator the gas generator housing (12) being tube-shaped or toroid-shaped.

14. A method for manufacturing a gas generator (10), comprising the following steps of:
providing a gas generator housing (12),
providing a subassembly (16) according to claim 8, and
inserting the subassembly (16) into the gas generator housing (12).

15. The method according to claim 14, wherein the igniter (24) is fastened to the first holder element (30) by partially forming the first holder element (30) and/or in that a socket (26) is inserted into or attached by injection-molding to the second holder element (32).

16. The igniter support (22) according to claim 1, wherein the projections (76) have an axial pressure surface (78) via which they interact with an axial contact surface (64) of the first holder element (30).

17. An igniter support (22) for an igniter unit (20) of a gas generator (10), comprising a first holder element (30) made from a first material and including axially protruding lugs (68) a second holder element (32) made from a second material different from the first material and including axially protruding projections (76), wherein both holder elements (30, 32) are positively coupled to each other-when the lugs (68) and the projections (78) are interdigitated with one another.

* * * * *